US008695937B2

(12) United States Patent
Yamada et al.

(10) Patent No.: US 8,695,937 B2
(45) Date of Patent: Apr. 15, 2014

(54) SEAT SLIDE APPARATUS FOR VEHICLE

(75) Inventors: Yukifumi Yamada, Toyota (JP); Naoki Goto, Tokai (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 128 days.

(21) Appl. No.: 13/527,810

(22) Filed: Jun. 20, 2012

(65) Prior Publication Data

US 2012/0318948 A1    Dec. 20, 2012

(30) Foreign Application Priority Data

Jun. 20, 2011    (JP) ................................ 2011-136581

(51) Int. Cl.
*F16M 13/00*    (2006.01)
*B60N 2/07*    (2006.01)
*B60N 2/06*    (2006.01)

(52) U.S. Cl.
CPC ............ B60N 2/0727 (2013.01); *B60N 2/0715* (2013.01); *B60N 2/062* (2013.01)
USPC ........................................ 248/429; 296/65.13

(58) Field of Classification Search
CPC ............ B60N 2/00; B60N 2/06; B60N 2/062; B60N 2/0715; B60N 2/0705; B60N 2/0825; B60N 2/0727; B60N 2/0875; B60N 2/0818
USPC ............ 248/424, 429, 430; 296/65.01, 65.11, 296/65.12, 65.13, 65.14, 65.15; 297/311, 297/331, 344.1
See application file for complete search history.

(56) References Cited

U.S. PATENT DOCUMENTS

| 7,665,791 | B2 * | 2/2010 | Kojima et al. | ............. 296/65.13 |
| 7,669,826 | B2 * | 3/2010 | Hayakawa et al. | ........... 248/430 |
| 8,075,039 | B2 * | 12/2011 | Rohee et al. | ................ 296/65.13 |
| 2002/0158178 | A1 * | 10/2002 | Garelick et al. | .............. 248/420 |
| 2013/0206952 | A1 * | 8/2013 | Yamada et al. | ................ 248/429 |

FOREIGN PATENT DOCUMENTS

JP    58-19836    2/1983

* cited by examiner

*Primary Examiner* — Todd M Epps
(74) *Attorney, Agent, or Firm* — Oblon, Spivak, McClelland, Maier & Neustadt, L.L.P.

(57) ABSTRACT

A seat slide apparatus for a vehicle includes a first rail provided with a limiting portion extending from an end of each of the first folded back wall portions at a predetermined position in a longitudinal direction of the first rail, a second rail provided with a first through-hole extending through each of the second side wall portions and a second through-hole extending through each of the adjacent second folded back wall portions, the through-holes facing in the width direction at a predetermined position in the longitudinal direction of the second rail, and locking members, each of which is inserted through the first through-hole and the adjacent second through-hole and bridges the second side wall portion and the adjacent second folded back wall portion in the width direction and blocks a movement of the limiting portion in directions the first rail and the second rail move relative to each other.

4 Claims, 6 Drawing Sheets

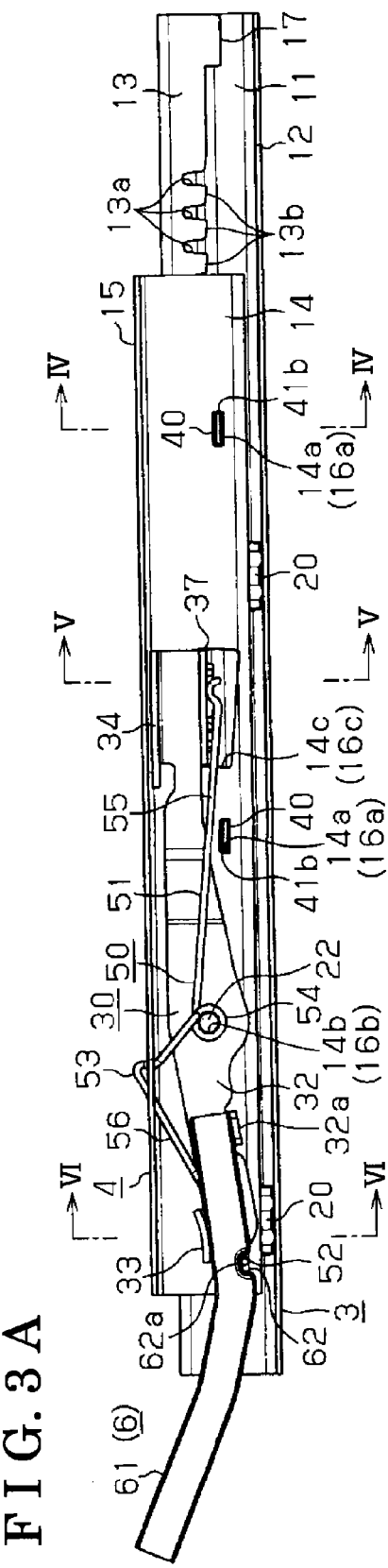
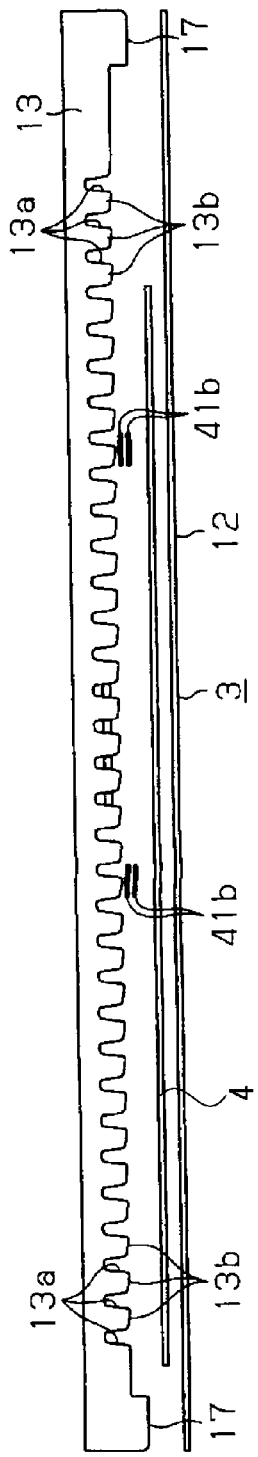
FIG. 3A
FIG. 3B

Width direction

Movement direction

US 8,695,937 B2

SEAT SLIDE APPARATUS FOR VEHICLE

CROSS REFERENCE TO RELATED APPLICATIONS

This application is based on and claims priority under 35 U.S.C. §119 to Japanese Patent Application 2011-136581, filed on Jun. 20, 2011, the entire content of which is incorporated herein by reference.

TECHNICAL FIELD

This disclosure generally relates to a seat slide apparatus for a vehicle.

BACKGROUND DISCUSSION

Various types of seat slide apparatuses for a vehicle have been disclosed in the past. For example, JPS58-19836U, hereinafter referred to as Reference 1, discloses a seat slide apparatus for a vehicle including a lower rail having flange portions and an upper rail embracing the flange portions. Incisions are made on an upper plate portion of the upper rail near each of the opposing ends, and cut out portions are formed on an inner edge of the flange portion of the lower rail at the opposing end portions. On assembling an apparatus having such structures, the lower rail is inserted to the upper rail first, then the portions where the incisions are made on the upper rail are bent in an inward direction to form cut-and-bent portions. The upper rail moves relative to the lower rail, however, an amount of the relative movement between the upper rail and the lower rail is limited to a predetermined amount by making a cut-and-bent portion come into contact and stop in an engaged state with a step portion of the lower rail, which is a portion the cut out portion provides.

In Reference 1, the cut-and-bent portions of the upper rail restrict the relative movement between the upper rail and the lower rail with only one side of the rails. In order to provide an adequate rigidity for the structure, a thickness of the upper rail, for example, may be increased.

FIGS. 9A and 9B illustrates a known seat slide apparatus for the vehicle including the lower rail 91 having a substantially U-shaped cross section provided with a pair of side wall portions 91a and the upper rail 92 attached inward of the lower rail 91 and configured to move relative to the lower rail 91. In this known seat slide apparatus for the vehicle, locking pins 93 are provided across the side wall portions 91a in a width direction with the opposing ends of each of the locking pins 93 being fastened to a corresponding side wall portion 91a such that blocks movements of end surfaces 92a of the upper rail 92. As a result, the amount the upper rail 92 moves relative to the lower rail 91 is limited to a predetermined amount by making the end surfaces 92a of the upper rail 92 come into contact and hold in engaged state with the corresponding locking pin 93. Each of the locking pins 93 restricts the relative movement of the upper rail 92 by holding the end surface 92a with both of the opposing sides in the width direction of the lower rail 91, so that an adequate rigidity for the structure may be provided.

With such a structure, however, a distance provided in the direction of the relative movement between the end surface 92a and the locking pin 93 defines the amount of the upper rail 92 moving relative to the lower rail 91 provided that the positions of the locking pins 93 are fixed to predetermined positions. In other words, the length of the upper rail 92 defines the amount of the upper rail 92 moving relative to the lower rail 91. While the length of the lower rail 91 being unchanged, when the length of the upper rail 92 changes, the amount of the relative movement between the lower rail 91 and the upper rail 92 automatically changes. As a result, flexibility for adjusting the amount of the relative movement between the lower rail 91 and the upper rail 92 significantly decreases.

A need thus exists for a seat slide apparatus for a vehicle, which is not susceptible to the drawback mentioned above.

SUMMARY

According to an aspect of this disclosure a seat slide apparatus for a vehicle includes a first rail configured to be fixed to either one of a vehicle floor or a seat, a second rail configured to be fixed to the other one of the vehicle floor or the seat being selected as the first rail, the second rail connected to the first rail and configured to move relative to the first rail. The first rail includes a pair of first side wall portions being arranged in parallel in a width direction, a pair of first folded back wall portions where each of the first folded back wall portions extends facing each other inward in the width direction from a corresponding distal end of the first side wall portions and then folds back in a direction of a proximal end of each of the first side wall portions, and a limiting portion extending further from an end of each of the first folded back wall portions at a predetermined position in a longitudinal direction of the first rail. The second rail includes a pair of second side wall portions being arranged in parallel in the width direction between the first side wall portions, a pair of second folded back wall portions where each of the second folded back wall portions extends in parting directions outward in the width direction from a corresponding distal end of the second side wall portions and then folds back in a direction of a proximal end of each of the second side wall portions into a space surrounded by the first side wall portion and the first folded back wall portion, and a first through-hole extending through each of the second side wall portions and a second through-hole extending through the adjacent second folded back wall portion, the through-holes facing in the width direction at a predetermined position in the longitudinal direction of the second rail. The seat slide apparatus for the vehicle also includes locking members, each of which is provided in an inserted manner through the first through-hole and through the second through-hole. Each of the locking member bridges a gap between the corresponding second side wall portion and the adjacent second folded back wall portion in the width direction. Each of the locking members blocks a movement of the limiting portion, the movement in directions the first rail and the second rail move relative to each other.

BRIEF DESCRIPTION OF THE DRAWINGS

The foregoing and additional features and characteristics of this disclosure will become more apparent from the following detailed description considered with the reference to the accompanying drawings, wherein:

FIG. 3A is a cross-sectional view of the seat slide apparatus for the vehicle according to the first embodiment being cut vertically;

FIG. 3B is another cross-sectional view of the seat slide apparatus for the vehicle according to the first embodiment being cut vertically;

DETAILED DESCRIPTION

Figure 1:
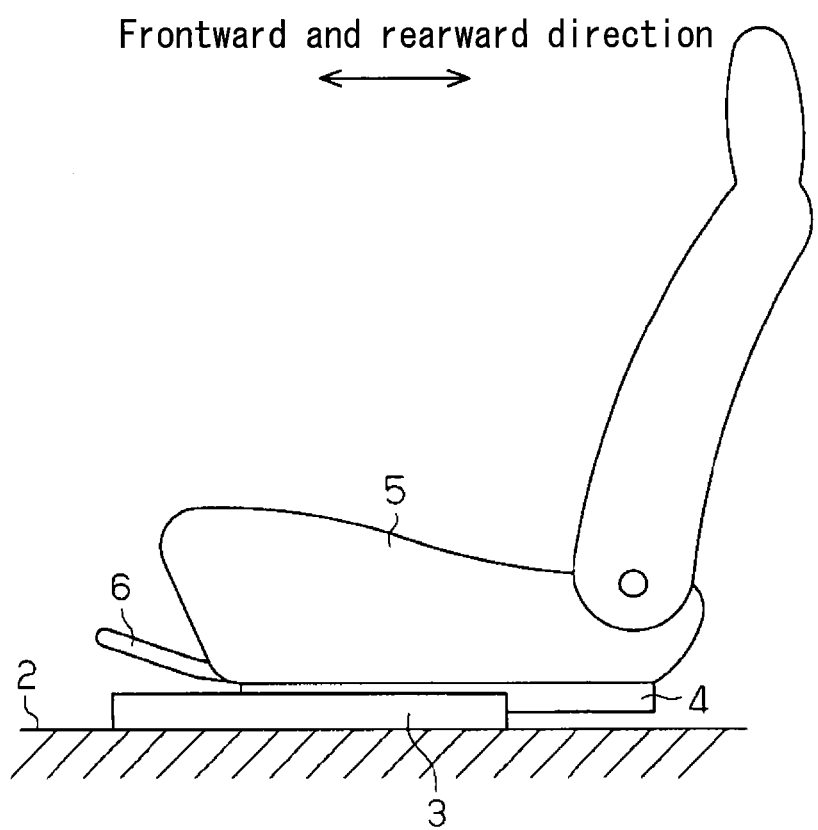
FIG. 1 is a side view of a seat for a vehicle in which a first embodiment of a seat slide apparatus for a vehicle is provided.

A first embodiment of a seat slide apparatus for a vehicle will be described as follows with references to FIGS. 1 to 8. As FIG. 1 illustrates, a lower rail 3, which serves as a first rail, is fixed to a vehicle floor 2 in a state where the lower rail 3 extends in a frontward and rearward direction, as indicated in the drawing. An upper rail 4, which serves as a second rail, is attached to the lower rail 3 in a state where the upper rail 4 is movable relative to the lower rail 3 in the frontward and rearward direction.

The lower rail 3 is provided in a pair and the upper rail 4 is provided in a pair. The lower rails 3 are disposed with spacing therebetween in a width direction. The upper rails 4 are disposed with spacing therebetween in the width direction. The width direction is the direction perpendicular to the surface of the paper where FIG. 1 is illustrated. FIG. 1 shows the lower rail 3 and the upper rail 4 that are being provided in the left direction of a seat 5 facing the frontward direction. The upper rails 4 retain and support the seat 5, which is configured to provide a seating portion for a driver or a passenger of the vehicle. Normally, the lower rails 3 and the upper rails 4 are locked in an engaged state. For unlocking the engagement of the lower rails 3 and the upper rails 4, a release handle 6 is provided for allowing the lower rails 3 and the upper rails 4 to move relative to each other.

Figure 2:
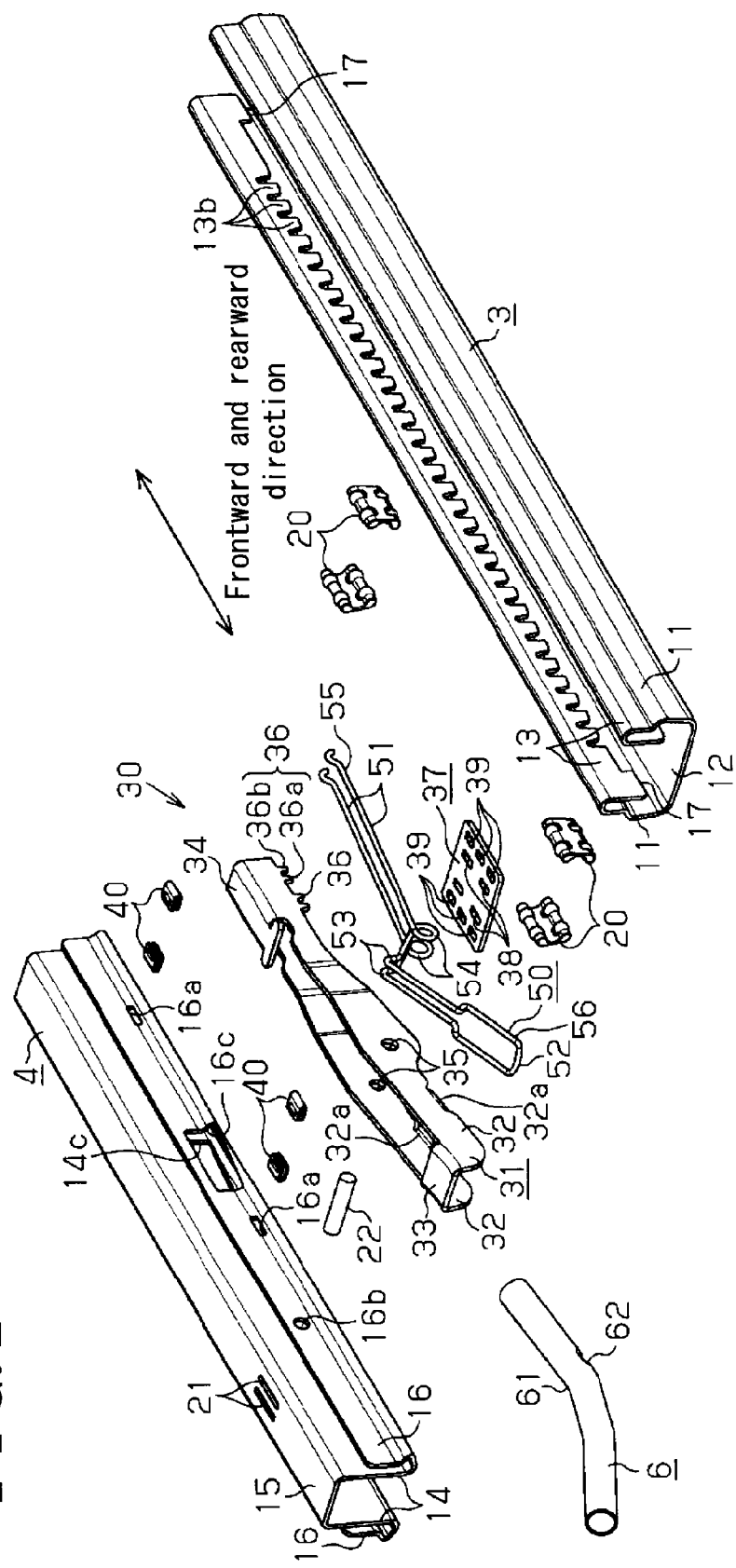
FIG. 2 is an exploded perspective view of the seat slide apparatus for the vehicle according to the first embodiment.

As FIG. 2 illustrates, each of the lower rails 3 is formed with a plate material. The lower rail 3 includes a pair of first side wall portions 11 and a first connecting wall portion 12. Each of the first side wall portions 11 extends in an upward and downward direction and the first connecting wall portion 12 connects proximal ends, or lower ends, of the first side wall portions 11. From a distal end, or an upper end, of each of the first side wall portions 11, a continuously formed first folded back wall portion 13 extends inward in the width direction and then folds back in a direction of the proximal end of the first side wall portion 11, which is in the direction substantially perpendicular to the first connecting wall portion 12.

Each of the upper rails 4 is formed with a plate material. As FIG. 2 and FIGS. 4 to 6 illustrates, the upper rail 4 includes a pair of second side wall portions 14 and a second connecting wall portion 15. Each of the second side wall portions 14 extends in an upward and downward direction between the first folded back wall portions 13. The second connecting wall portion 15 connects the proximal ends, or upper ends, of the second side wall portions 14, the ends further away from the lower rail 3. From a distal end, or a lower end, of each of the second side wall portions 14, a continuously formed second folded back wall portion 16 extends outward in the width direction and then folds back into a space surrounded by the first side wall portion 11 and the first folded back wall portion 13.

As a result, a cross section of the lower rail 3 and the upper rail 4 together resembles open ends of two U-shapes facing each other. The lower rail 3 and the upper rail 4 are restricted from sliding away from each other in the upward and downward direction mainly with an engagement of the first folded back wall portion 13 and the second folded back wall portion 16. The cross section of the lower rail 3 and the upper rail 4 together forms a rectangle, or a box shape. The lower rail 3 and the upper rail 4 together provide a space S.

Figure 6:
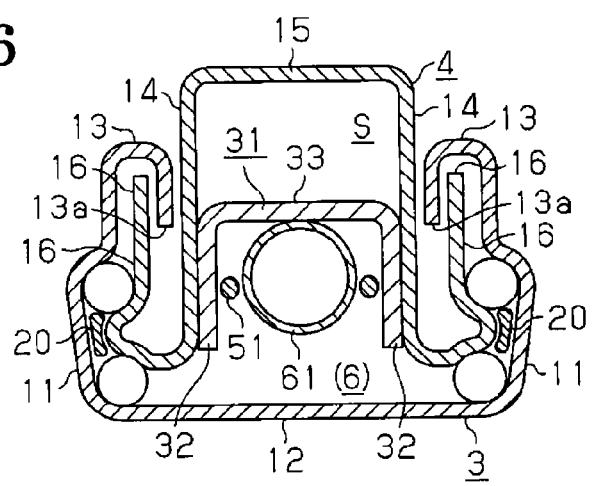
FIG. 6 is a cross-sectional view taken along line VI-VI in FIG. 3A.

As FIGS. 3A and 6 illustrate, a pair of rolling members 20, which are being aligned in the frontward and rearward direction of the lower rail 3 and the upper rail 4, are provided between each of the second folded back wall portion 16 and the first side wall portion 11 facing the second folded back wall portion 16. The upper rail 4 is slidably supported to the lower rail 3 with the rolling members 20 sliding between the lower rail 3 and the upper rail 4 so that the upper rail 4 slides in a longitudinal direction, or the frontward and rearward direction, relative to the lower rail 3.

As FIGS. 3A and 3B illustrate, each of the first folded back wall portions 13 of each of the lower rail 3 is provided with a multiple number of recesses 13a in a middle portion in the longitudinal direction of the lower rail 3 recessing from the distal end, or the lower end, of the first folded back wall portion 13 in the upward direction with a predetermined separation distance in the longitudinal direction between each recess 13a. At the same time, locking projections 13b, each of which is in a rectangular teeth form, are formed in the longitudinal direction of the lower rail 3 between adjacent recesses 13a. The locking projections 13b are provided with the same predetermined separation distance for the recesses 13a in the longitudinal direction between each locking projection 13b. At each opposing end portions in the longitudinal direction of each of the first folded back wall portion 13 of the lower rail 3, a limiting portion 17 such that provides a step extending further from the distal end, or the lower end, of the first folded back wall portion 13 in the downward direction. The locking projections 13b on each of the first folded back wall portion 13 are provided so that the locking projections 13b are arranged between the limiting portions 17 being provided at the opposing ends of each of the first folded back wall portions 13 in the longitudinal direction of the first folded back wall portion 13 of the lower rail 3.

Figure 4:
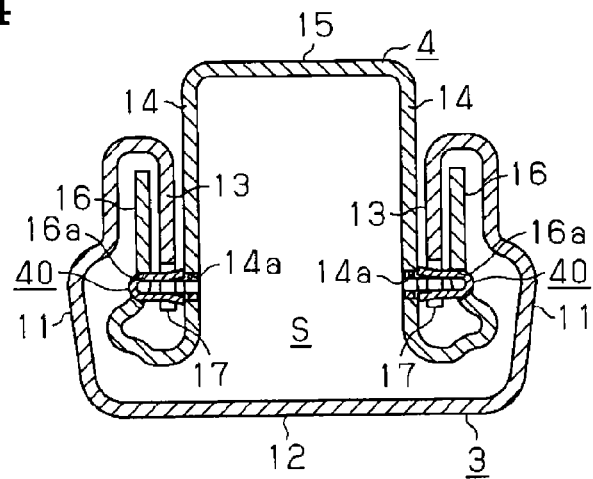
FIG. 4 is a cross-sectional view taken along line IV-IV in FIG. 3A.

At a middle portion in the longitudinal direction of each of the second side wall portion 14 of each of the upper rail 4, a pair of first through-holes 14a extending through the second side wall portion 14 are formed with a predetermined separation distance in the longitudinal direction between each of the first through-holes 14a. At the same time, as FIG. 4 illustrates, on each of the second folded back wall portion 16 of each of the upper rail 4, second through-holes 16a extending through the second folded back wall portion 16 are formed such that each of the second through-holes 16a faces the corresponding first through-hole 14a. In the upward and downward direction, each of the first through-holes 14a and each of the second through-holes 16a are provided at a position within a range between the lower end of the first folded back wall portion 13 and the lower end of the limiting portions 17.

Figure 8:
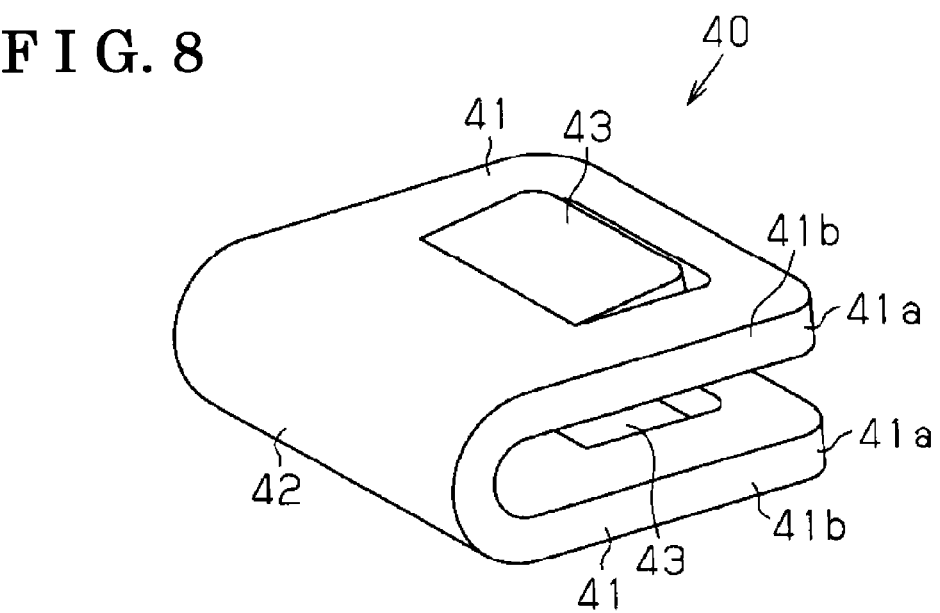
FIG. 8 is a perspective view of a locking member.
Figure 9A:
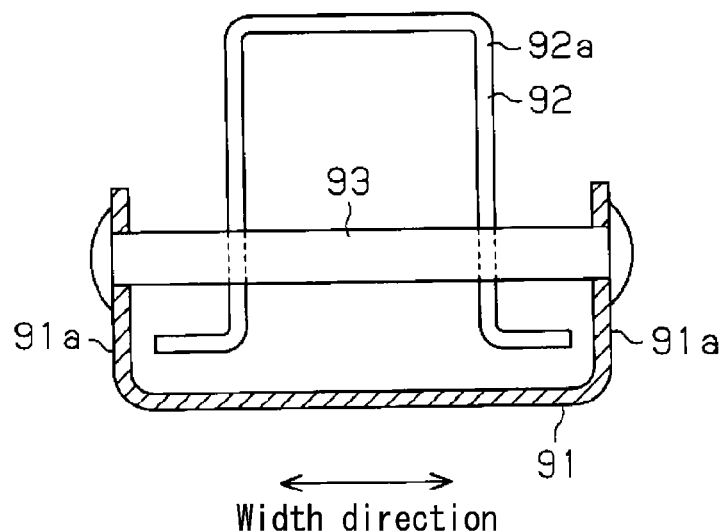
FIG. 9 A is a cross-sectional view illustrating a general representation of a known seat slide apparatus for a vehicle being cut in a width direction.
FIG. 9B is a cross-sectional view illustrating a general representation of the known seat slide apparatus for the vehicle being cut in a vertical direction.
Figure 9B:
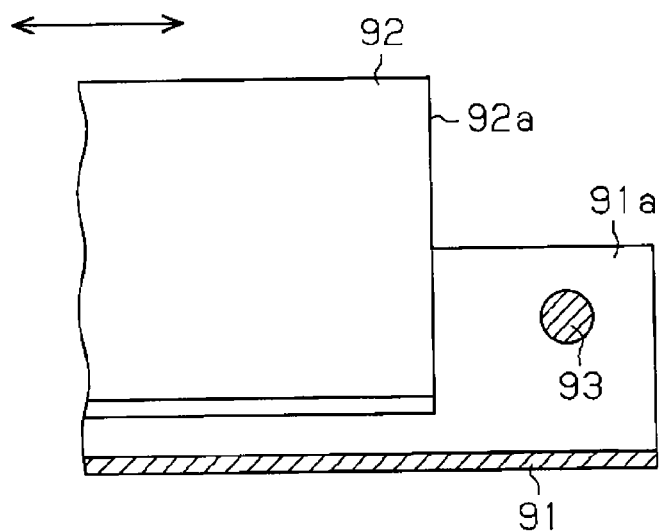

A locking member 40 is provided in an inserted manner through the first through-hole 14a and the second through-hole 16a, the through-holes 14a, 16a adjacent to each other in the width direction. Each of the locking members 40 bridges a gap between the corresponding second side wall portion 14 and the adjacent second folded back wall portion 16. FIG. 8 illustrates an example of the locking member 40. As an example, each of the locking members 40 is a plate spring formed by folding a metal plate into a U-shape. The locking member 40 includes a pair of engagement portions 41 arranged substantially parallel to each other and a connecting portion 42 having a substantially half cylinder form connecting between the engagement portions 41. The engagement portions 41 and the connecting portion 42 are being formed integrally. In a central portion of each of the engagement portions 41, a retaining portion 43, which is a cut-and-raised portion, is provided. A proximal end of each of the retaining portions 43, which is the end closer to the connecting portion 42, is retained and a distal end of each of the retaining portions 43 is raised outward, which is in the direction where distance between each of the distal ends increase. When the locking member 40 is in a free state, an end surface to an end surface span in the upward and downward direction between end portions 41a of the engagement portions 41 is configured to be slightly larger than the distance in the upward and downward direction of the first through-hole 14a.

Figure 7:
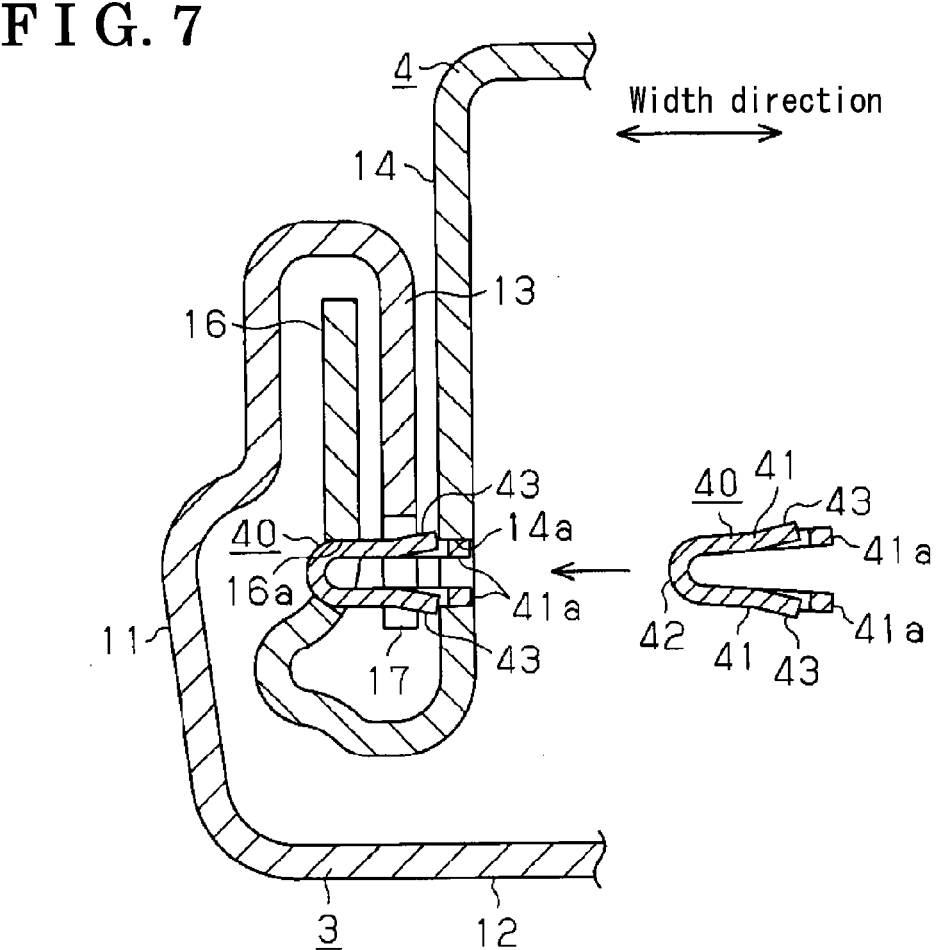
FIG. 7 is a cross-sectional view of the seat slide apparatus for the vehicle according to the first embodiment illustrating an assembly procedure.

When assembling the locking member 40 to the upper rail 4 of the seat slide apparatus having the aforementioned structures, the lower rail 3 and the upper rail 4 are assembled first in a state where the first through-holes 14a and the second through-holes 16a are arranged between the limiting portions 17 in the longitudinal direction. As FIG. 7 illustrates, the locking member 40 is inserted to the upper rail 4 from inner side of the upper rail 4 to the outward direction in the width direction through the first through-hole 14a and then through the second through-hole 16a in such order. The locking member 40 is inserted from the connecting portion 42 side through the first through-hole 14a and then through the second through-hole 16a in such order. When the locking member 40 is inserted to the first through-hole 14a, an elastic deformation of the engagement portions 41 occurs in the upward and downward direction, which is the direction where the engagement portions 41 approach each other, due to each of the engagement portions 41 or each of the retaining portions 43 being pressed against the inner peripheral surfaces in the upward and downward direction of the first through-hole 14a. When the connecting portion 42 is inserted through the second through-hole 16a completely and each of the retaining portions 43 passes through the first through-hole 14a, the retaining portion 43 is freed from the state of being pressed against the inner peripheral surfaces in the upward and downward direction of the first through-hole 14a, which brings each of the engagement portions 41 of the locking member 40 to move in the direction for returning to the state before the elastic deformation, which is in the direction for the distance between each of the engagement portions 41 to increase. At this time, each of the retaining portions 43 engages with an edge portion of the first through-hole 14a, the edge portion at the side opposite to the side the locking member 40 is inserted from, which is the edge portion of the first through-hole 14a at the inward in the width direction relative to the retaining portion 43, so that the locking member 40 is restrained from falling off from the upper rail 4. At the same time, the end portion 41a of each of the engagement portion 41 is pressed against the inner peripheral surfaces in upward and downward direction of the first through-hole 14a, so that the locking member 40 is retained to the upper rail 4.

Each of the locking members 40, which bridges the gap between the second side wall portion 14 and the second folded back wall portion 16 in the width direction, blocks the movement of the corresponding limiting portion 17, the movement in the direction the first rail 3 and the second rail 4 move relative to each other. As a result, when the lower rail 3 and the upper rail 4 move relative to each other, the movements stop when the limiting portions 17 and the locking members 40 come into contact. As FIG. 3A illustrates, each of the locking members 40 comes into contact with the corresponding limiting portion 17 at end surfaces 41b in the frontward and rearward direction, the surfaces facing the direction perpendicular to the direction of plate thickness, which is the direction perpendicular to the upward and downward direction. Accordingly, the amount of the relative movement between the lower rail 3 and the upper rail 4 is limited to a predetermined amount.

As FIG. 2 illustrates, a shaft retaining through-hole 16b, which is a circular through-hole, extends through each of the second folded back wall portion 16 of each of the upper rail 4 at a portion in the frontward direction relative to one of the second through-holes 16a, the one in the frontward direction. On each of the second folded back wall portion 16 of the upper rail 4, an opening 16c extending through the second folded back wall portion 16 is provided at a portion between the second through-holes 16a. The opening 16c extending through the second folded back wall portion 16 is a fan shaped opening including two arced edges in the longitudinal direction of the upper rail 4, which are portions of two concentric circles, and two straight edges connecting the arced edges. The arced edges share the same center of circle, which is at the shaft retaining through-hole 16b. On the second connecting wall portion 15 of the upper rail 4, a pair of supporting through-holes 21 being placed parallel to each other in the width direction are provided at a portion in the frontward direction relative to the shaft retaining through-hole 16b. Each of the supporting through-holes 21 has a slit form elongating in the frontward and rearward direction.

Figure 5:
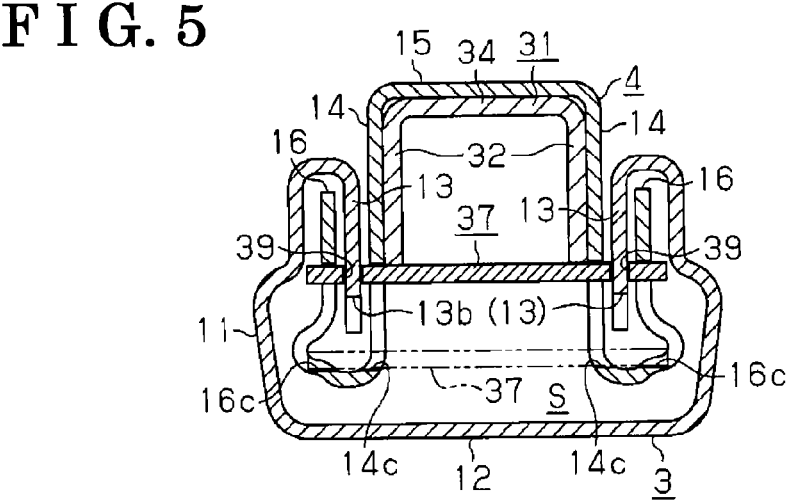
FIG. 5 is a cross-sectional view taken along line V-V in FIG. 3A.

As FIG. 3A illustrates, another shaft retaining through-hole 14b, which is a circular through-hole sharing the same center with the shaft retaining through-hole 16b, extends through each of the second side wall portion 14 of each of the upper rail 4. On each of the second side wall portion 14 of the upper rail 4, another opening 14c extending through the second side wall portion 14 is provided at a portion between the first through-holes 14a. The opening 14c extending through the second side wall portion 14 is a fan shaped opening including two arced edges in the longitudinal direction of the upper rail 4, which are portions of two concentric circles, and two straight edges connecting the arced edges. The arced edges share the same center of circle, which is at the shaft retaining through-hole 14b. Inner diameter of each of the shaft retaining through-holes 14b is equivalent to the inner diameter of each of the shaft retaining through-holes 16b. As FIGS. 3A and 5 illustrate, the shape of the opening 14c extending through the second side wall portion 14 and the shape of the opening 16c extending through the second folded back wall portion 16 are equivalent and facing each other in the width direction.

As FIG. 3A illustrates, a supporting pin 22 having a cylinder form with a center of the circle elongating in the width direction connects a locking lever 30 and the corresponding upper rail 4 so that the locking lever 30 rotates freely in a space within the upper rail 4. The locking lever 30 includes a handle portion 31 formed with a plate material elongating in the frontward and rearward direction, as FIG. 2 illustrates. The handle portion 31 includes a pair of vertical wall portions 32 aligned in parallel to each other in the width direction in an upright state for the entire length in the longitudinal direction. A distance in the width direction between the vertical wall portions 32 is shorter compared with the distance in the width direction between the second side wall portions 14 of the upper rail 4. A retaining wall 33 connects top edges at a frontward end portion of each of the vertical wall portions 32 in the width direction. An upper plate portion 34 connects top edges at a rearward end portion of each of the vertical wall portions 32 in the width direction. A shaft retaining through-hole 35, which is a circular through-hole sharing the same center with the supporting pin 22 and other shaft retaining through-holes 14b, 16b, extends through each of the vertical wall portions 32. The supporting pin 22 is inserted into the shaft retaining through-holes 14b, 16b, 35. The supporting pin 22 fits to the shaft retaining through-holes 14b, 16b at the opposing ends and pivotally supports the handle portion 31 at the shaft retaining through-holes 35 so that the handle portion 31 connects to the upper rail 4 in a freely rotatable state.

The retaining wall 33 is arced, having the arc projecting in the downward direction when viewed from a side. Between the retaining wall 33 and the shaft retaining through-hole 35 in the frontward and rearward direction, each of the vertical wall portion 32 includes a supporting wall 32a having a flange form. Each of the supporting wall 32a extends inward in the width direction from an edge of the lower end of the vertical wall portion 32 and faces the supporting wall 32a extending from the other vertical wall portion 32.

Each of the vertical wall portion 32 includes a pair of fastening portions 36 at the rear end portion. The fastening portions 36 are arranged at a position in the downward direction of where the upper plate portion 34 is. Each of the fastening portions 36 projects in the downward direction from the lower end of the vertical wall portion 32 with a predetermined distance in the frontward and rearward direction between each of the fastening portions 36. Each of the fastening portion 36 includes a pair of fastening protrusions 36a, 36b provided adjacent to each other in the frontward and rearward direction as a set. The locking lever 30 includes a locking plate 37 in a flat plate form extending in the frontward and rearward direction and in the width direction. The locking plate 37 penetrate through the opening 14c extending through the second side wall portion 14 and the opening 16c extending through the second folded back wall portion 16. The locking plate 37 is provided with a total of four through-holes 38 for fastening. Each of the through-holes 38 for fastening is in a form of a slit. Each slit extends through the locking plate 37 in the upward and downward direction at a position opposing the corresponding fastening portion 36. After each of the fastening portions 36 is inserted to the corresponding through-hole 38 for fastening, the fastening protrusions 36a, 36b that penetrated through the through-hole 38 for fastening is crushed such that the tips of fastening protrusions 36a, 36b point to the opposite directions, for example, one in the frontward direction and the other in the rearward direction, so that the locking plate 37 is fastened and retained to the handle portion 31.

The locking plate 37 is provided with a multiple number of through-holes 39 for locking arranged outward in the width direction relative to the fastening portion 36 and aligned in the frontward and backward direction with a predetermined separation distance between each of the through-holes 39 for locking. In the embodiment illustrated in FIG. 2, the number of through-holes 39 for locking is three on each side. As FIG. 5 illustrates, each of the through-holes 39 for locking extends through the locking plate 37 in the upward and downward direction at a position opposing the first folded back wall portion 13, the position configured to engage with a multiple number of adjacent locking projections 13b, which is three in the embodiment illustrated in FIG. 2, in the longitudinal direction of the lower rail 3.

The locking plate 37 illustrated in FIG. 5 with a solid line shows that when the locking lever 30 pivots around the supporting pin 22 in the direction for elevating the locking plate 37, which is in the direction the through-holes 39 for locking and the corresponding locking projections 13b fit to each other. When the through-holes 39 for locking and the corresponding locking projections 13b fit to each other, the relative movement between the lower rail 3 and the upper rail 4 are locked and retained. The locking plate 37 illustrated in FIG. 5 with a dashed-two dotted line shows that when the locking lever 30 pivots around the supporting pin 22 in the direction for lowering the locking plate 37, which is in the direction the through-holes 39 for locking and the corresponding locking projections 13b come off each other. At this time, the lower rail 3 and the upper rail 4 are released from the locked and retained state and allowed to move relative to each other.

As FIG. 2 illustrates, each of the upper rails 4 is provided with a wire spring 50 formed with a piece of wire material. The wire spring 50 is substantially U-shaped in a top view with an opening in the rearward direction. The wire spring 50 includes a pair of extending portions 51, which is being symmetric in the width direction and extending in the frontward and rearward direction, and an attachment portion 52, which connects the frontward portions of each of the extending portions 51 in the width direction. As FIGS. 2 and 3A illustrates, the wire spring 50 includes a fixing portion 53 on each of the extending portions 51. The fixing portion 53 is a middle portion on each of the extending portion 51 being curved in the longitudinal direction and projecting in the upward direction. The wire spring 50 also includes a coil portion 54 on each of the extending portions 51. The coil portion 54 is a portion in the direction rearward relative to the fixing portion 53 on each of the extending portion 51. Heading toward the rearward direction, the coil portion 54 is wound in a clockwise direction around the supporting pin 22. A first biasing portion 55, which includes the coil portions 54, on the wire spring 50 is a portion being formed in the direction rearward relative to the fixing portions 53 on the extending portions 51. A second biasing portion 56 is formed on the wire spring 50 at the attachment portion 52, which is a portion being formed in the direction frontward relative to the fixing portion 53 on the extending portions 51.

The wire spring 50 is provided in the space within the handle portion 31 such that each of the fixing portions 53 projects through the corresponding supporting through-holes 21 provided on the upper rail 4. The wire spring 50 is retained to the second side wall portions 14 of the upper rail 4 via the supporting pin 22 at the coil portion 54. Each of the fixing portions 53 of the wire spring 50 is being in contact with a rearward end surface of the corresponding supporting through-holes 21. Rearward end portions of the first biasing portion 55 is being in contact with a downward side surface of the locking plate 37 in a resilient state at a position rearward of the coil portion 54, which in other words is rearward of the supporting pin 22. The first biasing portion 55, which includes the coil portion 54, is bent and deformed with the fixing portion 53 as a supporting point, which is at a position where the upper rail 4 and the first biasing portion 55 are fixed to each other. Accordingly, the first biasing portion 55 biases the locking lever 30 with the fixing portion 53 as the supporting point. The wire spring 50 rotationally biases the locking lever 30 in a direction for elevating the locking plate 37, which is the direction where the locking projections 13b fit to the corresponding through-holes 39 for locking. The rotation is limited and locked with an upward side surface of the handle portion 31, which is the upward side surface of the upper plate portion 34, coming into contact with the downward side surface of the second connecting wall portion 15.

The coil portion 54 is provided on the first biasing portion 55 for reducing the elastic coefficient of the bending deformation and for reducing the length of the first biasing portion 55 extending in the frontward and rearward direction at the same time. Each of the fixing portions 53 of the wire spring 50 is configured to avoid contacting the frontward surface of the corresponding supporting through-hole 21. The attachment portion 52 of the wire spring 50, which in other words is the attachment portion 52 of the second biasing portion 56, is provided at a position in the frontward direction relative to the retaining wall 33.

The release handle 6 is formed with a tubular material being bent. The release handle 6 connects the upper rails 4 in the width direction at a frontward portion of each of the upper rails 4 such that bridges between the upper rails 4. As FIG. 2 illustrates, an end portion 61 of the release handle 6, each of which extends at rearward portions of the release handle 6, is in a tubular form having an outer diameter smaller than the distance between the vertical wall portions 32 in the width direction. Each of the end portions 61 is formed with a retaining recess 62 in a form of a slit that extends in the width direction at a downward side portion.

As FIG. 3A illustrates, each of the end portions 61 of the release handle 6 is inserted between the corresponding vertical wall portions 32 at a position between a downward side surface of the retaining wall 33 and the upward side of the supporting wall 32a of the handle portion 31 of the corresponding locking lever 30. The attachment portion 52 of the wire spring 50 fits to the corresponding retaining recess 62 so that the end portion 61 of the release handle 6 is retained to and restrained from coming off from the locking lever 30. In other words, a rearward end surface 62a of each of the retaining recesses 62 is a surface adapted to engage with each of the attachment portions 52 for restraining each of the end portions 61 of the release handle 6 from coming off from the corresponding locking lever 30. The supporting pin 22 is disposed on the extended line in the rearward direction from each of the end portions 61 of the release handle 6 being inserted to the vertical wall portion 32. Each of the supporting pins 22 is disposed such that faces the corresponding end portion 61 of the release handle 6. Accordingly, each of the supporting pins 22 prevents the excessive insertion of each of the end portions 61 of the release handle 6 into the corresponding portion between the vertical wall portions 32 by restraining the amount of insertion to a predetermined range, which is the range until the end portion 61 of the release handle 6 reaches the supporting pin 22.

Each of the end portions 61 of the release handle 6 being inserted between the corresponding vertical wall portions 32 is biased in the elevating direction by the wire spring 50 at the corresponding retaining recess 62. As a result, the end portions 61 of the release handle 6 is retained to the locking levers 30 such that the end portions 61 of the release handle 6 and the locking levers 30 rotate integrally in a state where the upward side portion of each of the end portions 61 of the release handle 6 is in contact with the downward side surface of the corresponding retaining wall 33 and the downward side portion of each of the end portions 61 of the release handle 6 is in contact with the upward side surfaces of the corresponding supporting walls 32a. In other words, the wire spring 50 is provided so that the release handle 6 and the locking lever 30 rotate integrally and so that the release handle 6 is retained to the locking lever 30 with resilience. One reason for the end portions 61 of the release handle 6 being retained with resilience at the attachment portions 52 of the wire springs 50 is for providing comfortable feeling of connection between the end portions 61 of the release handle 6 and the locking levers 30. Another reason is to avoid excessive loads being applied to the locking levers 30 by allowing swinging movements of the end portions 61 of the release handle 6 relative to the locking levers 30 when the end portions 61 of the release handle 6 is applied with an unintentional external force that works to rotate the end portions 61 of the release handle 6 around the supporting pins 22, the rotation in the opposite direction to the intended operational direction. The attachment portions 52 of the wire spring 50, which in other words is the attachment portions 52 of the second biasing portion 56, for retaining the end portions 61 of the release handle 6 is provided at portions in the frontward direction relative to the retaining walls 33, in order to restrain the release handle 6 from swinging relative to the locking levers 30 with the attachment portions 52 as the center.

Operations of the seat slide apparatus for the vehicle according to the first embodiment of will be described next, starting from the state where no operating force is provided at the release handle 6. In this state, due to the biasing force of the wire spring 50 at each of the first biasing portions 55, each of the locking levers 30 is pivoted integrally with the corresponding end portion 61 of the release handle 6 in the direction for elevating the corresponding locking plate 37 with the center of rotation at the supporting pin 22, which is the direction for each of the through-holes 39 for locking to fit to the corresponding locking projection 13b, so that each of the lower rails 3 and the upper rails 4 are restrained from moving relative to each other. The position of the seat 5 being retained to the upper rails 4 in the frontward and rearward direction is being maintained.

When the release handle 6 is operated such that frontward end of the release handle 6 is raised, each of the locking levers 30 is pivoted against the biasing force of each of the wire spring 50, which is the biasing force at the first biasing portion 55. Each of the locking levers 30 is pivoted with the center of rotation at the corresponding supporting pin 22. Each of the locking levers 30 is pivoted integrally with the corresponding end portion 61 of the release handle 6 in the direction for lowering the locking plate 37, which is the direction for each of the through-holes 39 for locking being removed from the corresponding locking projection 13b, so that each of the lower rails 3 and the upper rails 4 are released from the state where the relative movement to each other is maintained in a locked state. Thus the seat 5 being retained to the upper rails 4 is allowed to move in the frontward and rearward direction for adjusting the position. When each of the upper rails 4 moves relative to the corresponding lower rail 3 to the most frontward end or to the most rearward end, the limiting portions 17 and the locking members 40 come into contact so that the movement relative to each other is restrained. As a result, the amount of relative movement between each of the lower rails 3 and the upper rails 4 is limited within a predetermined range. The locking members 40 that contact the corresponding limiting portions 17 are provided on both of the opposing sides in the width direction of the upper rail 4, where each of the locking members 40 is retained at the corresponding second side wall portion 14 and the adjacent second folded back wall portion 16. As a result, rigidity of the engagement between the lower rail 3 and the upper rail 4 that move relative to each other is increased compared to when the relative movement of the lower rail 3 and the upper rail 4 is blocked with one side of the rails.

Advantages of the seat slide apparatus for the vehicle according to the first embodiment will be described next. When the lower rail 3 moves relative to the upper rail 4, the contact between the limiting portion 17 and the locking member 40 limits the relative movement of each other. As a result, the amount of relative movement between the lower rail 3 and the upper rail 4 is limited within a predetermined range. The locking members 40, each of which being retained at the corresponding second side wall portion 14 and at the second folded back wall portion 16, the locking members 40 that come into contact with the corresponding limiting portions 17, are provided on both of the opposing sides in the width direction of the upper rail 4. As a result, rigidity of the engagement between the lower rail 3 and the upper rail 4 that move relative to each other is increased compared to when the relative movement of the lower rail 3 and the upper rail 4 is blocked with one side of the rails. While avoid interfering with the functions of the surrounding components, for example the locking lever 30, the locking members 40 may be provided on arbitrary positions in the longitudinal direction on the upper rail 4. As a result, flexibility for adjusting the amount of the relative movement between the lower rails 3 and the upper rails 4 may be increased.

With the seat slide apparatus for the vehicle according to the first embodiment, when assembling the locking members 40 to the upper rail 4, each of the locking members 40 is inserted to the first through-hole 14a and the second through-hole 16a while end portions 41a of each of the locking members 40 is elastically deformed in the upward and downward direction, which is the direction where the end portions 41a approach each other, so that the end portions 41a are pressed against the surfaces opposing in the upward and downward direction, the surfaces forming the portions of the inner peripheral surfaces of the first through-hole 14a or of the second through-hole 16a. As described, another advantage is that the assembling procedure for the locking members 40 to the upper rail 4 being simple.

With the seat slide apparatus for the vehicle according to the first embodiment, when each of the limiting portions 17 comes into contact with the corresponding locking member 40, the locking member 40 holds the limiting portion 17 in the engaged state at the end surfaces 41b facing the direction perpendicular to the direction of the plate thickness. Compared with when the locking member 40 holds the limiting portion 17 at a surface in the direction of the plate thickness, the locking member 40 may hold the relative movement between the lower rail 3 and the upper rail 4 in the engaged state with increased rigidity as a result.

With the seat slide apparatus for the vehicle according to the first embodiment, each of the retaining portions 43 engages with the edge portion of the first through-hole 14a or of the second through-hole 16a, the edge portion in the side opposite of the side the locking member 40 is inserted from when the locking member 40 is inserted to the first through-hole 14a and the second through-hole 16a, so that the locking member 40 is restrained from falling off from the upper rail 4.

In addition, with the seat slide apparatus for the vehicle according to the first embodiment, bending procedure for a known apparatus after each of the lower rails 3 and the upper rails 4 are assembled together for providing structures for stopping the relative movement of the lower rail 3 and the upper rail 4 becomes unnecessary.

Other embodiments of the seat slide apparatus for the vehicle will be described next. The seat slide apparatus for the vehicle according to the first embodiment may be modified or enhanced in following manners. Each of the retaining portions 43 of each of the locking members 40 may engage with an edge portion of the second through-hole 16a for restraining the locking member 40 from falling off from the upper rail 4. Each of the locking members 40 may be assembled to the upper rail 4 in a state such that the locking member 40 holds the limiting portion 17 at a surface in the direction of the plate thickness.

The number of the locking members 40 to be provided on each of the upper rails 4 may be one and on one side in the width direction of each of the upper rails 4. The limiting portions 17 may be provided on one side in the width direction of each of the lower rails 3 and the corresponding locking members 40 may be provided on the corresponding one side in the width direction of the corresponding upper rail 4.

Each of the limiting portions 17 may be provided at a middle portion of each of the first folded back wall portions 13 in the longitudinal direction of the lower rail 3. Correspondingly, each of the locking members 40 may be provided at opposing end portions in the longitudinal direction of the upper rail 4. In this embodiment, the number of the limiting portions 17 to be provided on one side in the width direction of each of the lower rails 3 may be one or a pair of limiting portions 17 being separated with a space in the longitudinal direction.

Each of the locking members 40, which is inserted to the first through-hole 14a and the second through-hole 16a, may be a flat plate or a wedge being press fit or welded such that bridges across the first through-hole 14a and the second through-hole 16a.

Each of the lower rails 3 and each of the upper rails 4 may be a component formed with multiple numbers of plate materials being welded or constructed with a similar method. Fixing position of each of the lower rails 3 and the upper rails 4 may be reversed in the upward and downward direction such that the lower rails 3 may be fixed to the seat 5 and the upper rails 4 may be fixed to the vehicle floor 2. In such case, the release operation for the locking levers 30 being provided in a proximity of the vehicle floor 2 may be operated with other appropriate component via a cable or with similar method.

The number of the lower rails 3 and the upper rails 4, in other words the number of the seat slide apparatus for the vehicle, provided for the seat 5 may be one for each seat 5, or three or more for each seat 5.

The direction of the movement of the seat 5 as a result of the relative movement between the lower rails 3 and the upper rails 4 may be in the width direction, or other directions.

According to an aspect of this disclosure the seat slide apparatus for the vehicle includes the lower rail 3 configured to be fixed to either one of the vehicle floor 2 or the seat 5, the upper rail 4 configured to be fixed to the other one of the vehicle floor 2 or the seat 5 being selected as the lower rail 3, the upper rail 4 connected to the lower rail 3 and configured to move relative to the lower rail 3. The lower rail 3 includes a pair of first side wall portions 11 being arranged in parallel in the width direction, a pair of first folded back wall portions 13 where each of the first folded back wall portions 13 extends facing each other inward in the width direction from the corresponding distal end of the first side wall portions 11 and then folds back in a direction of the proximal end of each of the first side wall portions 11, and the limiting portion 17 extending further from the end of each of the first folded back wall portions 13 at the predetermined position in the longitudinal direction of the lower rail 3. The upper rail 4 includes a pair of second side wall portions 14 being arranged in parallel in the width direction between the first side wall portions 11, a pair of second folded back wall portions 16 where each of the second folded back wall portions 16 extends in parting directions outward in the width direction from the corresponding distal end of the second side wall portions 14 and then folds back in a direction of the proximal end of each of the second side wall portions 14 into the space surrounded by the first side wall portion 11 and the first folded back wall portion 13, and the first through-hole 14a and the second through-hole 16a, the through-holes 14a, 16a facing in the width direction at the predetermined position in the longitudinal direction of the upper rail 4. The seat slide apparatus for the vehicle also includes the locking members 40, each of which is provided in the inserted manner through the first through-hole 14a and through the second through-hole 16a. Each of the locking members 40 bridges a gap between the corresponding second side wall portion 14 and the adjacent second folded back wall portion 16 in the width direction. Each of the locking members 40 blocks a movement of the corresponding limiting portion 17, the movement in directions the lower rail 3 and the upper rail 4 move relative to each other.

When the lower rail 3 moves relative to the upper rail 4, the contact between the limiting portion 17 and the locking member 40 limits the movement relative to each other. As a result, the amount of relative movement between the lower rail 3 and the upper rail 4 is limited within the predetermined range. The locking members 40, each of which is being retained at the corresponding second side wall portion 14 and the second folded back wall portion 16 of the upper rail 4, the locking members 40 that come into contact with the corresponding limiting portions 17, are provided on both of the opposing sides in the width direction of the upper rail 4. As a result, rigidity of the engagement between the lower rail 3 and the upper rail 4 that move relative to each other is increased compared to when the relative movement of the lower rail 3 and the upper rail 4 is blocked with one side of the rails. While avoid interfering with the functions of the surrounding components, for example the locking lever 30, the locking members 40 may be provided on arbitrary positions in the longitudinal direction on the upper rail 4. As a result, flexibility for adjusting the amount of the relative movement between the lower rail 3 and the upper rail 4 may be increased.

According to another aspect or this disclosure, each of the locking members 40 is the plate spring being folded in the state where end portions 41a pressure contact with surfaces opposing in one direction, the surfaces forming portions of the inner peripheral surfaces of the first through-hole 14a or of the second through-hole 16a.

When assembling the locking members 40 to the upper rail 4, each of the locking members 40 is inserted to the first through-hole 14a and the second through-hole 16a while end portions 41a of each of the locking members 40 is elastically deformed in the upward and downward direction, which is the direction where the end portions 41a approach each other, so that the end portions 41a are pressed against the surfaces opposing in the upward and downward direction, the surfaces forming the portions of the inner peripheral surfaces of the first through-hole 14a or of the second through-hole 16a. Accordingly, the assembling procedure for the locking members 40 to the upper rail 4 is simple.

According to further aspect of this disclosure, each of the locking members 40 formed of the plate material is configured to come into contact with the limiting portion 17 corresponding to the locking member 40 at an end surface 41b of the locking member 40 facing the direction perpendicular to the direction of plate thickness.

When each of the limiting portions 17 comes into contact with the corresponding locking member 40, the locking member 40 holds the limiting portion 17 in the engaged state at the end surfaces 41b facing the direction perpendicular to the direction of the plate thickness. Compared with when the locking member 40 holds the limiting portion 17 at the surface in the direction of the plate thickness, the locking member 40 may hold the relative movement between the lower rail 3 and the upper rail 4 in the engaged state with increased rigidity as a result.

According to further aspect of this disclosure, each of the locking members 40 includes the retaining portion 43, which corresponds to a cut-and-raised portion configured to engage with the edge portion of the first through-hole 14a or of the second through-hole 16a, the edge portion at the side opposite to the side which the locking member 40 is inserted from when the locking member 40 is inserted to the first through-hole 14a and the second through-hole 16a.

Each of the retaining portions 43 engages with the edge portion of the first through-hole 14a or of the second through-hole 16a, the edge portion at the side opposite to the side which the locking member 40 is inserted from when the locking member 40 is inserted to the first through-hole 14a and the second through-hole 16a, so that the locking member 40 is restrained from falling off from the upper rail 4.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat slide apparatus for a vehicle comprising:
a first rail configured to be fixed to either one of a vehicle floor or a seat;
a second rail configured to be fixed to other one of the vehicle floor or the seat being selected as the first rail, the second rail connected to the first rail and configured to move relative to the first rail;
the first rail including a pair of first side wall portions being arranged in parallel in a width direction, a pair of first folded back wall portions where each of the first folded back wall portions extends facing each other inward in the width direction from a corresponding distal end of the first side wall portions and then folds back in a direction of a proximal end of each of the first side wall portions, and a limiting portion extending further from an end of each of the first folded back wall portions at a predetermined position in a longitudinal direction of the first rail;
the second rail including a pair of second side wall portions being arranged in parallel in the width direction between the first side wall portions, a pair of second folded back wall portions where each of the second folded back wall portions extends in parting directions outward in the width direction from a corresponding distal end of the second side wall portions and then folds back in a direction of a proximal end of each of the second side wall portions into a space surrounded by the first side wall portion and the first folded back wall portion, a first through-hole extending through each of the second side wall portions and a second through-hole extending through the adjacent second folded back wall portion, the through-holes facing in the width direction at a predetermined position in the longitudinal direction of the second rail; and locking members, each of which is provided in an inserted manner through the first through-hole and through the second through-hole, wherein each of the locking members bridges a gap between the corresponding second side wall portion and the adjacent second folded back wall portion in the width direction, and wherein each of the locking members blocks a relative movement of the first rail and the second rail by coming into contact with the limiting portion.

2. The seat slide apparatus for the vehicle according to claim 1, wherein each of the locking members is a plate spring being folded in a state where end portions pressure contact with surfaces opposing in one direction, the surfaces forming portions of inner peripheral surfaces of the first through-hole or of the second through-hole.

3. The seat slide apparatus for the vehicle according to claim 1, wherein each of the locking members formed of a plate material is configured to come into contact with the limiting portion at an end surface of the locking member facing a direction perpendicular to a direction of plate thickness.

4. The seat slide apparatus for the vehicle according to claim 2, wherein each of the locking members includes a retaining portion, which corresponds to a cut-and-raised portion configured to engage with an edge portion of the first through-hole or of the second through-hole, the edge portion at the side opposite to the side which the locking member is inserted from when the locking member is inserted to the first through-hole and the second through-hole.

* * * * *